United States Patent [19]

Bendoraitas et al.

[11] Patent Number: 4,847,963
[45] Date of Patent: Jul. 18, 1989

[54] CAMSHAFT MANUFACTURE

[75] Inventors: John A. Bendoraitas, Harwinton, Conn.; Jeffrey A. Clark, Anderson, S.C.

[73] Assignee: The Torrington Company, Torrington, Conn.

[21] Appl. No.: 246,572

[22] Filed: Feb. 6, 1989

Related U.S. Application Data

[62] Division of Ser. No. 103,310, Sep. 30, 1987, Pat. No. 4,809,562.

[51] Int. Cl.⁴ .................. B23P 15/00; B23P 11/02; B21D 39/00
[52] U.S. Cl. ................... 29/156.4 R; 29/523; 29/525
[58] Field of Search .............. 29/523, 525, 156.4 R; 74/567

[56] References Cited

U.S. PATENT DOCUMENTS

| | | | |
|---|---|---|---|
| 1,390,949 | 9/1921 | Yassenoff | 74/567 |
| 2,465,144 | 3/1949 | Wyatt | 29/523 UX |
| 4,293,995 | 10/1981 | Jordan | 29/523 X |
| 4,575,913 | 3/1986 | Sugiuchi et al. | 29/432 |
| 4,597,365 | 7/1986 | Madoffer | 29/156.4 R X |
| 4,620,454 | 11/1986 | Sugiuchi et al. | 74/567 |
| 4,638,683 | 1/1987 | Ogawa et al. | 74/567 |
| 4,644,912 | 2/1987 | Umeha et al. | 74/567 X |
| 4,660,269 | 4/1987 | Suzuhi | 74/567 X |
| 4,708,029 | 11/1987 | Urano | 74/567 |

FOREIGN PATENT DOCUMENTS

| | | | |
|---|---|---|---|
| 9034 | 1/1981 | Japan | 29/523 |
| 149655 | 9/1982 | Japan | 74/567 |
| 74965 | 4/1986 | Japan | 74/567 |
| 850058 | 9/1960 | United Kingdom | 29/523 |
| 1117816 | 6/1968 | United Kingdom | 74/567 |
| 2133104 | 7/1984 | United Kingdom | 74/567 |

Primary Examiner—Charlie T. Moon
Attorney, Agent, or Firm—Frank S. Troidl

[57] ABSTRACT

Individually produced cams and journals are fastened to a hollow tube to form a camshaft by outwordly deforming the tube with a lost mandrel which is left in the tube to form a seal.

2 Claims, 1 Drawing Sheet

CAMSHAFT MANUFACTURE

This is a division of application Ser. No. 103,310 filed Sept. 30, 1987, now U.S. Pat. No. 4,809,562.

BACKGROUND OF THE INVENTION

This invention relates to camshafts for internal combustion engines and the like. More particularly, the invention relates to camshafts and a method of making a camshaft in which individually produced cams and journal elements are fastened to a hollow tube by outwardly deforming the tube with a lost mandrel which is left securely in position to form a seal in the tube.

Due to increasing demand for higher performance, lower maintenance and better fuel economy, it is desirable to make automotive camshafts lighter and more durable. Thus camshafts have been developed which have separately produced cam elements for better wear resistance and steel tube for weight saving.

These types of camshafts are manufactured by assembling the individual components, such as cams and journal elements, on a separate, hollow tube and then securing the assembled elements together. However, these assembled camshafts and the methods of making them have many shortcomings which result in time consuming assembly steps, large assembly force requirements and excessive tolerance control. All of these result in more costly manufacture.

U.S. Pat. No. 4,597,367 to Madaffer discloses an assembled camshaft formed of an expandable steel tube and separately hardened cam and journal elements. The elements are secured together by mechanical expansion of the tube. A round forming mandrel is pushed through the tube to expand the tube wall outward to provide a tight engagement fit with the hexagonal openings in the cam and journal elements. The method disclosed in this patent requires a large amount of force since both the inner diameter and outer diameter of the tube is completely expanded. Additionally, after the forming mandrel has been forced through the tube, it must be slowly drawn back through the tube to minimize metal to metal contact. Thus, this method of manufacture requires large amounts of force and time.

Furthermore, if it is desired to seal or plug the hollow tube forming the camshaft, separate manufacturing and assembly steps are required. The closure member must be manufactured with close tolerances so that it will securely fit and seal the hollow deformed camshaft tube. Otherwise, a separate sealing operation such as brazing must be performed. Thus, a camshaft having a plugged tube requires additional manufacturing steps and expensive tolerance control.

SUMMARY OF THE INVENTION

The present invention provides a new sealed camshaft assembly of separately produced elements and a new method for making these assemblies. The present invention provided an improved sealed camshaft construction. Additionally, the new method of make the camshaft assemblies simplifies and eliminates manufacturing steps of previously known methods.

Accordingly, one object of this invention is to provide a method for locking individual cam and journal elements onto the tube using localized deformation of the tube.

Another object of this invention is to provide a lost mandrel type forming plug which can be used to deform the tube so as to lock the elements onto the tube and then remain in the tube as an integral sealing plug.

This invention provides a high performance, low cost camshaft assembly and a manufacturing process using commonly available materials that is capable of being easily implemented. These and other feature and advantages of the invention will be more fully understood from the following description of a preferred embodiment, taken together with the accompanying drawings.

DETAILED DESCRIPTION OF THE PREFERRED EMBODIMENT

Figure 1:
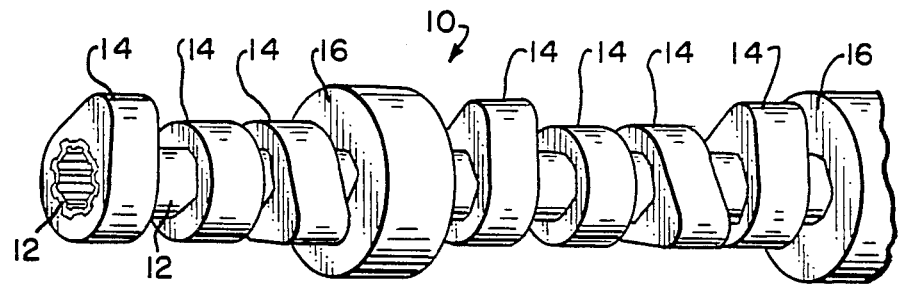
FIG. 1 is a pictorial view of a portion of a camshaft assembly formed in accordance with the present invention.

Referring now to FIG. 1 of the drawings, numeral 10 generally indicates a finished camshaft assembly formed in accordance with the present invention. Camshaft 10 includes a hollow supporting tube or shaft 12, preferably formed of ordinary low carbon steel which has been locally expanded in a manner to be subsequently described. Securely positioned on the tube are a plurality of cam elements 14 and journal elements 16. The elements are spaced axially along the shaft. The cam elements 14 are angularly orientated in a predetermined phase relationship for actuating the valves of an internal combustion engine. The cam and journal elements are separately manufactured to produce the best wear resisting properties. They may be formed by machining or by powdered metal techniques, for example.

The assembly provides a lightweight, high strength camshaft due to the hollow tubular support and the separately produced high strength elements.

Figures 2, 3:
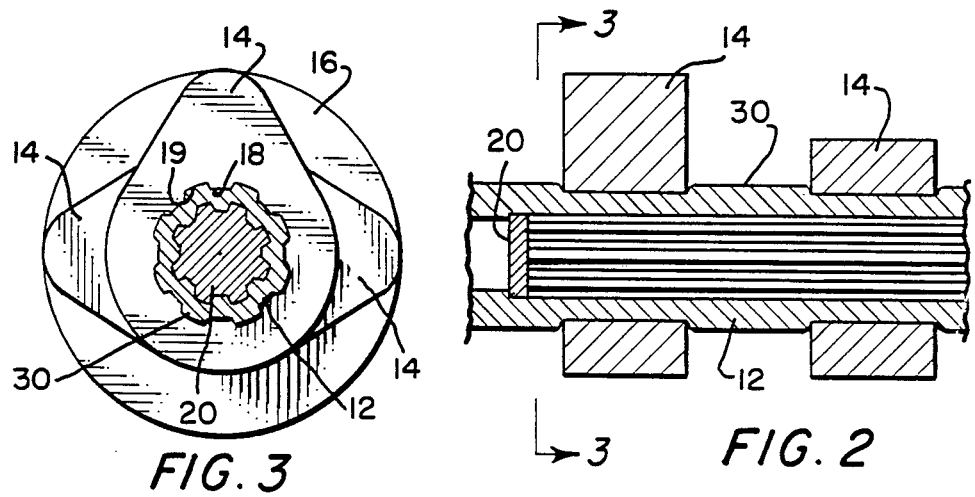
FIG. 2 is a longitudinal cross-sectional view of a portion of a camshaft assembly.
FIG. 3 is a cross-sectional view of a portion of a camshaft assembly along by lines 3—3 of FIG. 2.

The camshaft of the present invention is assembled in accordance with the following steps:

The camshaft elements that are desired to have a high wear resistance such as the cams and journal elements are formed to relatively close final tolerances by individual processes. A small amount of excessive material is left for grinding after assembly. As seen in FIG. 3, each element is provided with an axial opening 18 which is preferably configured in a general scalloped circle shape. A number of equally spaced, axially extending grooves 19 form the scalloped border around the generally circular opening. Any number of grooves can be utilized, as for example four to twelve grooves. An opening having eight grooves is shown in the drawing.

The central tube or shaft 12 is made of low carbon steel tubing of proper outer and inner diameters. The tube is cut to a desired camshaft length. The tube outer diameter is preferably such as to fit closely but easily within the preformed openings 18 in the elements 14 and 16. The inner diameter of the tube is selected to provide adequate wall strength for manufacturing while limiting deformation by mechanically expansion in a manner to be subsequently described.

The individual cam and bearing race elements are inserted into a fixture which prepositions them in a desired orientation. The openings 18 are axially aligned for insertion of the tube.

The tube 12 is inserted through the aligned elements to a predetermined longitudinal position.

Figure 5:
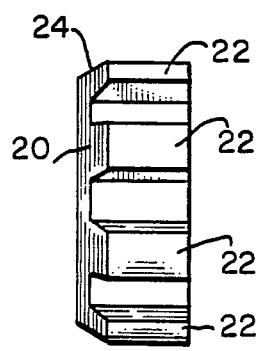
FIG. 5 is a side view of the forming plug.
Figure 4:
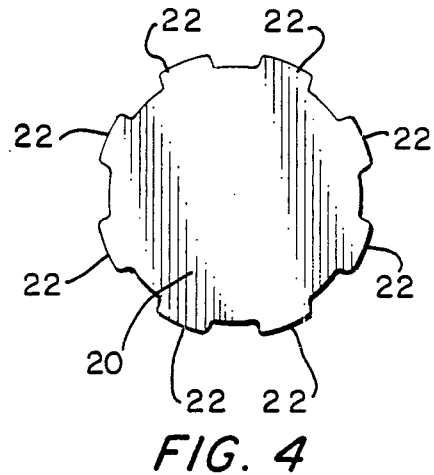
FIG. 4 is a frontal view of the forming plug.

A lost mandrel forming plug 20 is used as the tooling bit or mechanical tube expander. FIGS. 4 and 5 show the forming plug of the present invention. Plug 20 has a generally circular shape. The outer periphery has a number of equally spaced buttons 22. The buttons 22 complement the shape of the grooves 19 in the axial openings of the elements. The average or effective diameter of the plug is slightly larger than the original tube diameter. The leading edge of the cylindrical plug has a slight taper 24 that is calculated for a light press or expansion fit up with the inside diameter of the tube to be worked up. The buttons 22 will actually deform the inside diameter of the tube to the extent that local bulges or projections 30 are formed on the outside of the tube. Due to their placement in a fixture, the corresponding grooves in the axial openings of the cams and journal elements are aligned with these bulges or projections. These local bulges fill the grooves 19 and overflow ahead of and behind the cams and journals. The localized deformation of the tube metal cause the cams and journals to be locked on axially and radially to the hollow tube.

When the lost mandrel forming plug has been pushed through the hollow tube to a predetermined axial position beyond all elements to be secured on the shaft, the lost mandrel is released from the pusher. The pusher may now be easily and quickly withdrawn from the tube with minimal metal to metal contact. The mandrel is left in the tube as a plug or seal. No additional manufacturing or assembly steps are required to seal this side of the tube. This reduces the tube sealing steps by one half.

The assembled, unfinished camshaft may be removed from the fixture and the wearing surfaces of the cams and journals ground to final dimensions in any conventional manner.

The camshaft assembly and method in accordance with the present invention provides the advantages of lightweight with relatively simple and low cost manufacture. Additionally, when forming a plugged camshaft, there are less manufacturing steps and the tooling tolerances for a seal are relaxed since the forming mandrel is also seal used as one sealing plug.

While the invention has been described by reference to one preferred embodiment chosen for purposes of illustration, it should be understood that numerous changes could be made in the camshaft design and manufacturing process without departing from the spirit scope of the invention. Accordingly, it is intended that the invention be limited only by the language of the following claims.

I claim:

1. A method of making a camshaft assembly comprising:
    providing a plurality of cam and journal elements, each including an axial opening having a generally circular shape with axially extending grooves;
    positioning said elements in a predetermined phase and axial spacing orientation with said openings aligned on a common axis;
    inserting a hollow tube into said elements in close fitting relation with said openings;
    providing a forming plug having a shape complementary with the shape of said ground openings and an average diameter larger than the tube inner diameter;
    forcing said forming plug through said tube to a predetermined position to outwardly deform the tube wall;
    expanding the hollow tube into mechanical interference engagement with all of the element openings so as to secure the elements permanently onto the tube in said predetermined orientation; and
    plugging said hollow tube by leaving said forming plug in tight mechanical interference engagement with the tube inner diameter at said predetermined position.

2. The method as in claim 1 wherein said forcing is caused by an assembly machine member which can be readily withdrawn after the forming plug reaches the predetermine position.

* * * * *